(12) United States Patent
Erickson et al.

(10) Patent No.: US 6,632,050 B2
(45) Date of Patent: Oct. 14, 2003

(54) FACE HOBBING CUTTER

(75) Inventors: Robert A. Erickson, Raleigh, NC (US);
Paul A. Brown, Hostetter, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/947,622

(22) Filed: Sep. 6, 2001

(65) Prior Publication Data

US 2003/0044246 A1 Mar. 6, 2003

(51) Int. Cl.$^7$ .............................. B26D 1/12; B23C 5/20
(52) U.S. Cl. .............................. 407/21; 407/23; 407/25
(58) Field of Search .............................. 407/20, 21, 22, 407/23, 24, 25, 26, 27, 28, 113, 114, 115, 116, 119

(56) References Cited

U.S. PATENT DOCUMENTS

| | | | | |
|---|---|---|---|---|
| 1,820,415 A | * | 8/1931 | Wildhaber | 407/22 |
| 2,033,384 A | * | 3/1936 | Marshall | 407/22 |
| 2,186,417 A | | 1/1940 | Kraus | 29/105 |
| 2,270,003 A | * | 1/1942 | Head | 407/22 |
| 2,524,301 A | * | 10/1950 | Bauer | 407/22 |
| 3,487,592 A | | 1/1970 | Kotthaus | 51/288 |
| 3,571,875 A | * | 3/1971 | Grandi et al. | 407/27 |
| 3,571,876 A | * | 3/1971 | Blakesley | 407/22 |
| 3,673,655 A | * | 7/1972 | Eydieux | 407/22 |
| 4,093,391 A | * | 6/1978 | Bachmann et al. | 407/22 |
| 4,268,194 A | | 5/1981 | Bloink et al. | 407/41 |
| 4,530,623 A | | 7/1985 | Kotthaus | 407/22 |
| 4,621,954 A | | 11/1986 | Kitchen et al. | 407/22 |
| 5,290,135 A | * | 3/1994 | Ball et al. | 407/11 |
| 5,890,846 A | | 4/1999 | Clark et al. | 407/21 |
| 5,934,841 A | * | 8/1999 | Rutschke et al. | 407/22 |
| 6,120,217 A | * | 9/2000 | Stadtfeld et al. | 407/21 |
| 6,311,590 B1 | * | 11/2001 | Stadtfeld | 82/1.11 |

* cited by examiner

Primary Examiner—Henry W. H. Tsai
(74) Attorney, Agent, or Firm—Larry R. Meenan

(57) ABSTRACT

A face hobbing cutter including a cutter body having a top surface and a bottom surface and a side surface extending between the top surface and the bottom surface. A plurality of slots are formed within the cutter body extending from the top surface inward into the cutter body. The slots are adapted to receive cutting blades wherein each cutting blade is fixed in position in the respective slot by a wedge clamping assembly. The wedge clamping assembly includes a wedge block and a wedge screw for operatively securing the wedge block within the respective slot. The wedge block includes an outwardly facing locking surface for engaging a side of the cutting blade. The face hobbing cutter further includes an adjustable stop. The adjustable stop is in communication with the slot to support the cutting blade at the desired height from the top surface of the face hobbing cutter.

38 Claims, 5 Drawing Sheets

FACE HOBBING CUTTER

BACKGROUND OF THE INVENTION

1. Field of the Invention

This invention relates to a face hobbing cutter. More particularly, this invention relates to a face hobbing cutter including a plurality of wedge clamping assemblies for securing cutting blades.

2. Description of the Related Art

Face hobbing comprises cutting blades arranged about a cutter, not in line with each other, but in groups, usually pairs comprising an inner cutting blade and an outer cutting blade. Unlike most face milling processes, in which all cutting blades pass through the tooth slot during its formation, face hobbing comprises each successive group of cutting blades passing through respective successive tooth slot with each blade in the group forming a cut completely along the longitudinal portion of the tooth slot. The cutter and the workpiece rotate in a timed relationship with each other thereby allowing continual indexing of the workpiece and continual formation of each tooth slot of the gear. A single pair of cutting blades produces a tooth slot.

In hobbing processes to produce gears, it is known to utilize cutting tools wherein one or more cutting blades are positioned in and project from cutter head assemblies. See, for example, U.S. Pat. No. 4,621,954 to Kitchen et al. or U.S. Pat. No. 5,890,846 to Clark et al., incorporated herein by reference. The cutting blades are typically secured in position in a cutter head by one or more clamping screws. The clamping screws may be in direct contact with the cutting blades such as shown in U.S. Pat. No. 4,268,194 to Bloink et al. or U.S. Pat. No. 4,530,623 to Kotthaus, incorporated herein by reference. In other instances, clamping screws may contact a clamp block which in turn contacts a cutting blade as can be seen, for example, in the previously mentioned U.S. Pat. No. 4,621,954 or U.S. Pat. No. 5,890,846. With the clamp block arrangement, clamping forces can be spread out along the blade-clamp block interface instead of the point contact that occurs with direct contact between the clamp screw and cutting blade.

The present invention is specifically concerned with improvements in face hobbing cutters designed for use in gear cutting machinery capable of generating tooth profiles for spiral, bevel and hypoid gears. In applications of this type, dimensional relationships of the cutting blades are extremely critical and must be maintained to close tolerances in order to obtain a desired tooth profile for each tooth and slot of the final gear product. One of the relationships which must be carefully maintained is the angle and position of the cutting face (or chip face) of each cutting blade relative to the cutter head assembly in which it is carried and to the workpiece which is being cut. Although cutting blades of the type shown in U.S. Pat. No. 2,186,417 require no resharpening of their front faces, it is believed that all prior efforts in designing and resharpening cutting tools for gear cutting applications have required a careful resharpening of the cutting face each time the cutting tool is resharpened for further usage in a cutter head assembly (see, for example, U.S. Pat. No. 3,487,592). This requirement of past designs adds to the cost of use of a particular tool.

In contrast to prior art methods, the present invention provides for a cutter head assembly which permits use of individual cutting blades which can be easily replaced as necessary and adjusted in such a manner that all of the critical relationships required for gear cutting applications are maintained. Thus, a cutter head assembly is specifically designed in accordance with the present invention to receive a cutting blade which can be replaced as desired and easily adjusted to obtain optimum cutting performance of the face hobbing cutter.

SUMMARY OF THE INVENTION

Briefly, according to this invention, there is provided a face hobbing cutter. The face hobbing cutter includes a cutter body having a top surface and a bottom surface and a side surface extending between the top surface and the bottom surface. A plurality of slots are formed within the cutter body extending from the top surface inward into the cutter body. The slots are adapted to receive cutting blades; wherein each cutting blade is fixed in position in the respective slot by a wedge clamping assembly. The wedge clamping assembly includes a wedge block and a wedge screw for operatively securing the wedge block within the respective slot. The wedge block includes a locking surface for engaging a side of the cutting blade. The face hobbing cutter further includes an adjustable stop. The adjustable stop is in communication with the slot to support the cutting blade at the desired height from the top surface of the face hobbing cutter.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
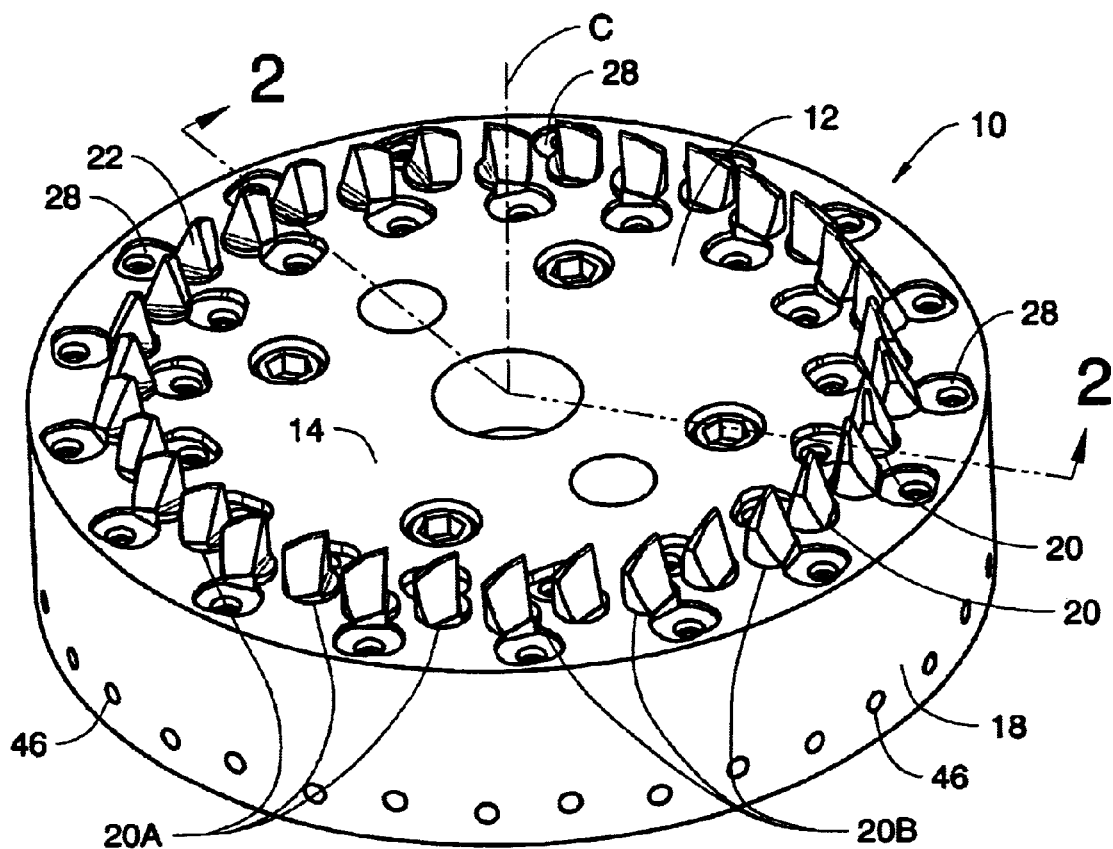
FIG. 1 is a perspective view of a face hobbing cutter in accordance with the present invention.
Figure 2:
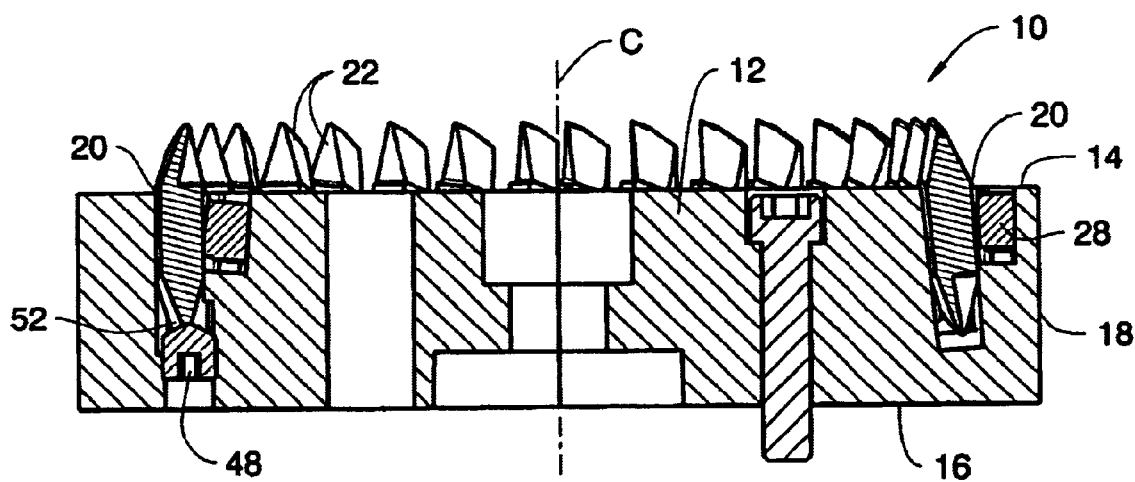
FIG. 2 is a cross sectional view of the face hobbing cutter of FIG. 1 taken along line 2—2.
Figure 3:
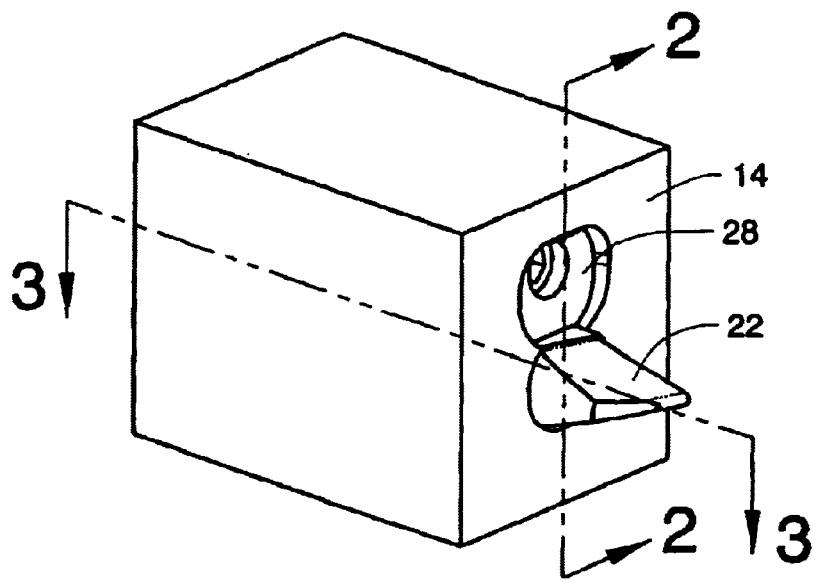
FIG. 3 is a partial view of a cutting blade and wedge clamping assembly of FIG. 1.
Figure 12:
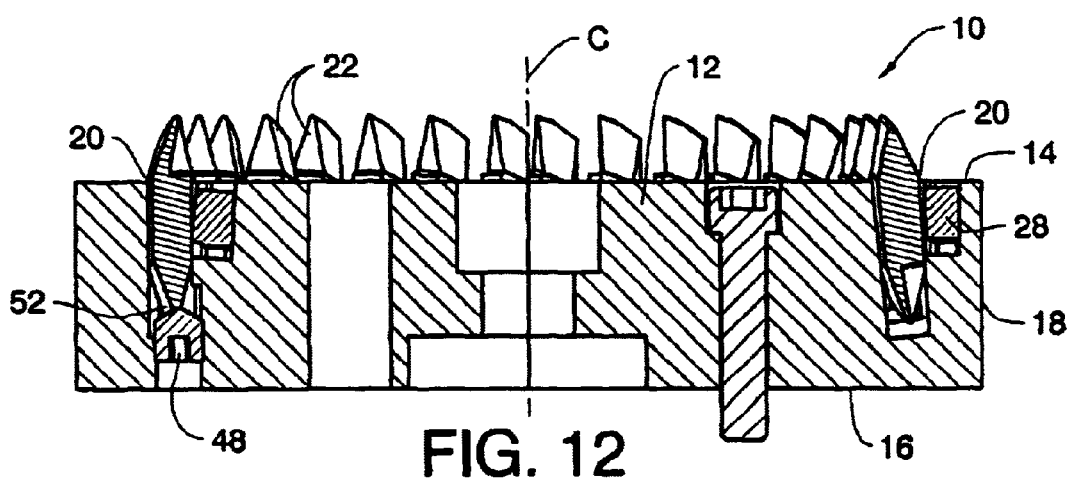
FIG. 12 is a cross sectional view of the alternate face hobbing cutter of FIG. 1 taken along line 2—2.

The present invention will now be discussed in detail with reference to the accompanying drawings. Referring to FIGS. 1, 2 and 12, there is shown a face hobbing cutter 10 in accordance with the present invention for producing a spiral bevel gear. The face hobbing cutter 10, when positioned on a spindle of a machine tool of a type well known in the art, is rotatable about a central axis of rotation C.

The face hobbing cutter 10 includes a cutter body 12 comprising a circular disk having a top surface 14 and a bottom surface 16 and a side surface 18 extending between the top surface and the bottom surface. Formed within the cutter body 12 are a plurality of slots 20 located around the perimeter of the cutter body and extending from the top surface 14 inward into the cutter body. The slots 20 are adapted to receive cutting blades 22. In a preferred embodiment, the cutting blades 22 comprise a body of hard, wear resistant, coated or uncoated materials including tungsten carbide-based cemented carbides, Ti(C, N)-based cermets, polycrystalline cubic boron nitrides (either of the ceramic type or the cermet type), and ceramics such as alumina, silicon nitride, and SiAlON-based (i.e., more than 50 volume percent) materials either with or without a ceramic particulate or whisker (e.g., zirconia, tungsten carbide, titanium carbide, titanium carbonitride and/or titanium nitride) reinforcement phase dispersed therein, or mixtures thereof as is well known in the art.

The slots 20 may be formed within the cutter body 12 to accept the inserts 22 by a reaming operation as well known in the art. The slots 20 may extend from the top surface 14 completely through the cutter body 12 to the bottom surface 16 or the slots may extend from the top surface only partially through the cutter body as desired.

In a preferred embodiment, the slots 20 are arranged in an alternating arrangement between a first set of slots 20A oriented in a substantially vertical orientation, i.e., parallel to the central axis (C) of the cutter body 12, and a second set of slots 20B oriented in an inclined position, i.e., angled with respect to the central axis of the cutter body. The second set of slots 20B are inclined at an angle toward the central axis of rotation (C) in a direction moving away from the top surface 14 of the cutter body 12. However, it will be appreciated that the orientation of the slots 20A and 20B may be reversed, for example, the first set of slots 20A may be oriented in an inclined position and the second set of slots 20B may be oriented in a substantially vertical orientation and the invention may function equally as well. The orientation of the tips of the cutting blades 22 within the slots are such that when the cutting blades are placed in the first set of slots 20A, the cutting blades cut and form one side of the gear tooth and when the cutting blades are placed in the second set of slots 20B, the cutting blades cut and form the other side of the same gear tooth thereby completing the formation of the gear teeth. It will be appreciated that the combined alternating first and second sets of slots 20A and 20B cooperatively create the proper geometry for each tooth of the gear to be machined.

As shown in FIG. 1, each cutting blade 22 is fixed in position in the respective slot 20 by a wedge clamping assembly 24. Consequently, a plurality of wedge clamping assemblies 24 are positioned about the circumference of the top surface 14 of the cutter body 12. The wedge clamping assemblies 24 alternate between the radially inward and radially outward side of the slot 20 to support the cutting blade 22 in the slot during cutting of the gear teeth. The wedge clamping assemblies are positioned opposite of the direction of the cutting force acting on the cutting blade 22 to support each cutting blade during cutting of the gear teeth.

As shown in FIGS. 3–5 and 7, the wedge clamping assembly 24 includes a wedge screw 26 and a wedge block 28 disposed within an opening 30. The opening 30 includes two interconnected apertures 30a and 30b. In a preferred embodiment, the apertures 30a and 30b have dissimilar cross sectional widths. The central axis (B) of the opening 30 is angled from the central axis of the slot (A). In a preferred embodiment shown in FIGS. 3–5 and 7, the angle between the central axis (B) and central axis (A) is between zero and ten degrees and most preferably between four and seven degrees. In an alternate embodiment as shown in FIG. 14, the slot 20 and aperture 30B terminate short of the bottom surface 16.

Figure 4:
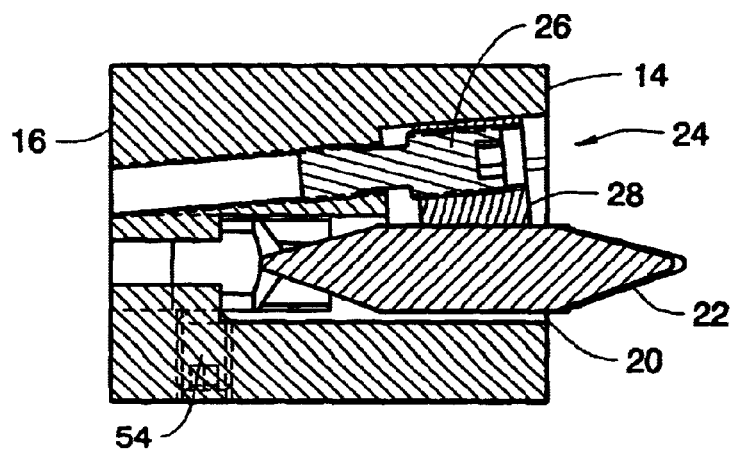
FIG. 4 is a cross sectional view of the cutting blade and wedge clamping assembly of FIG. 3 taken along line 4—4.
Figure 6:
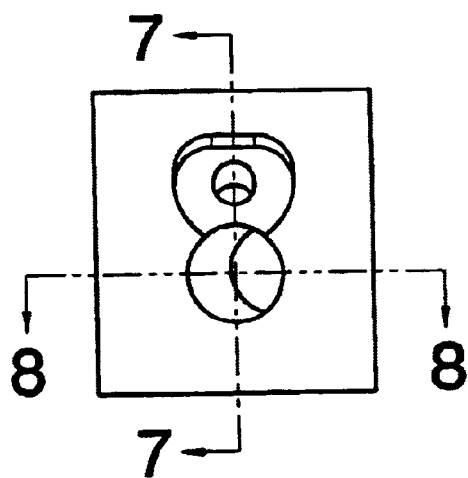
FIG. 6 is a partial top view of the partial view of the apertures of the wedge clamping assembly.
Figure 7:
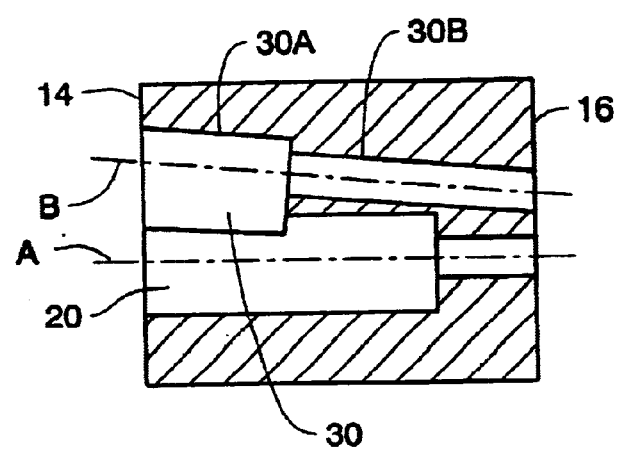
FIG. 7 is a cross sectional view of the wedge clamping assembly of FIG. 6 taken along line 7—7.
Figures 13, 14:
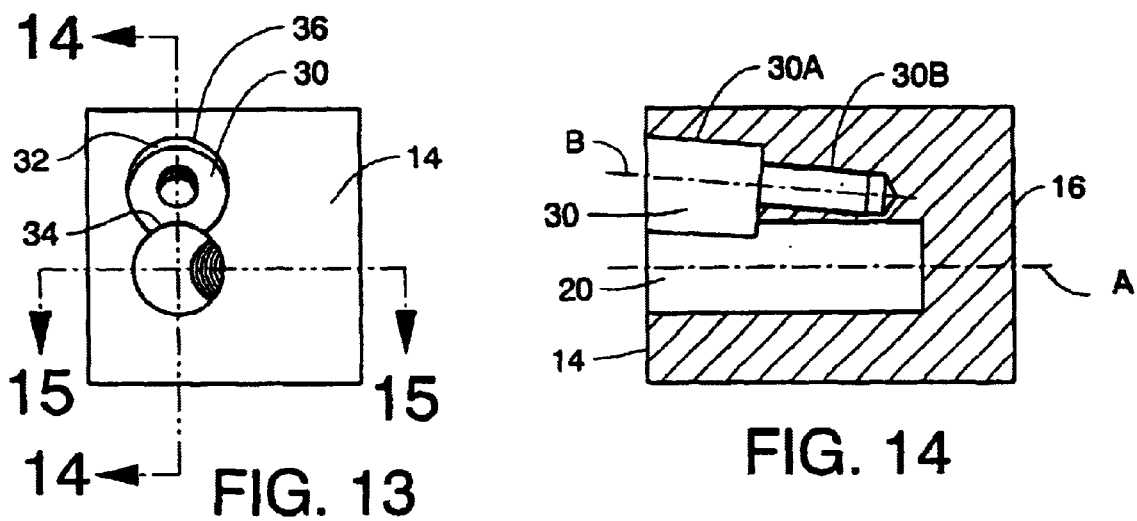
FIG. 13 is a partial view of a cutting blade and wedge clamping assembly of FIG. 12.
FIG. 14 is a cross sectional view of the wedge clamping assembly of FIG. 13 taken along line 13—13.

As shown in FIGS. 4, 7 and 14, the apertures 30a and 30b are positioned with the aperture 30a having the largest cross sectional width atop the smaller cross section width aperture 30b. As shown in FIG. 13, the upper aperture 30a is generally semicircular in form or as shown in FIG. 6 generally elliptical in form and includes a rear portion 32 and a forward portion 34. The rear portion 32 includes an arcuate shape bearing wall 36 (FIG. 13) or a planar shape bearing wall (FIG. 6) that tapers outwardly as it extends upwardly from the bottom of the upper aperture 30a. The forward portion 34 of the upper aperture 30a is in communication with the slot 20 thereby forming a large generally figure "8" shape opening in the top surface 14 of the cutter body 12 (see FIGS. 6 and 13).

The lower aperture 30b (FIGS. 7 and 14) is threaded to receive the wedge screw 26. The axis of the threaded aperture 30b is disposed parallel and offset from the central axis of the upper aperture 30a and is parallel to the rear arcuate bearing wall 36 of the wedge clamping assembly 24.

Figure 9:
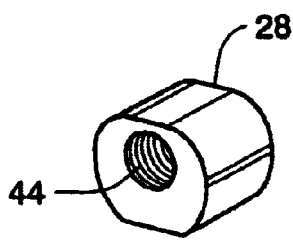
FIG. 9 is a perspective view of a wedge block of the wedge clamping assembly.
Figure 10:
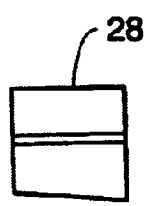
FIG. 10 is a side view of the wedge block of FIG. 9.
Figure 11:
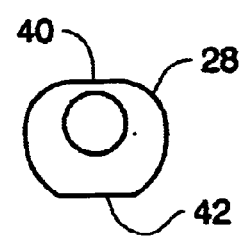
FIG. 11 is an end view of the wedge block of FIG. 9.

Disposed within each upper aperture 30a is a semicircular shape wedge block 28 (FIGS. 16–18) or a generally elliptical shape wedge block (FIGS. 9–11). In a preferred embodiment, the wedge block 28 may be formed of 4140 or 4340 steel which is heat treated to obtain a hardness of between 40 and 45 on the Rockwell C scale. The wedge block 28 includes an inwardly facing surface 40 for abutting the rear bearing wall 36 of the wedge opening 30 and an exposed, outwardly facing locking surface 42 for engaging the side of the cutting blade 22. A threaded opening 44 extends through the wedge block 28 from the top surface of the wedge block to the bottom surface of the wedge block. The threaded opening 44 is in axial alignment with the lower threaded aperture 30b of the clamping assembly 24.

Figure 23:
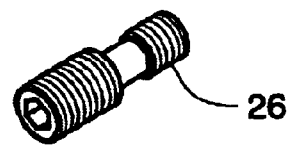
FIG. 23 is a perspective view of the screw of the wedge clamping assembly.
Figure 24:
FIG. 24 is a side view of the screw of FIG. 23.
Figure 25:
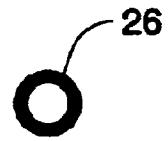
FIG. 25 is an end view of the screw of FIG. 23.

One end of a differential wedge screw 26 (FIGS. 23–25) is threaded into the threaded aperture 30b formed in the clamping assembly, while the opposite end thereof is threaded into the wedge block 28. An internal hexagon adapted to receive an Allen key wrench is formed in at least one end of the differential wedge screw 26. When the differential wedge screw 26 is rotated in one direction, the wedge block 28 is moved downwardly into the narrow portion of the upper aperture 30a as the screw 26 threads itself into the opening 30. At the same time this is occurring, the locking surface 42 of the wedge block 28 is moved progressively outwardly into engagement with a side of the cutting blade 22 and the side of the upper aperture 30a due to the angular disposition of the screw axis (B). The resulting compression of the wedge block 28 generates frictional locking forces which firmly secure the cutting blade 22 into the slot 20.

Figure 5:
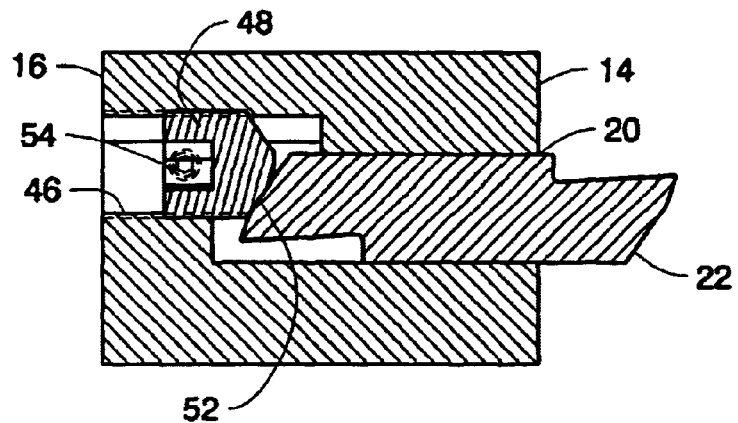
FIG. 5 is a cross sectional view of the cutting blade and wedge clamping assembly of FIG. 3 taken along line 5—5.
Figure 8:
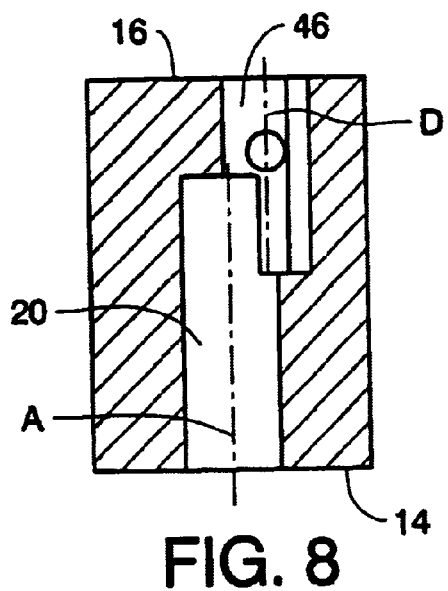
FIG. 8 is a cross sectional view of the wedge clamping assembly of FIG. 7 taken along line 8—8.
Figures 15, 16, 17, 18:
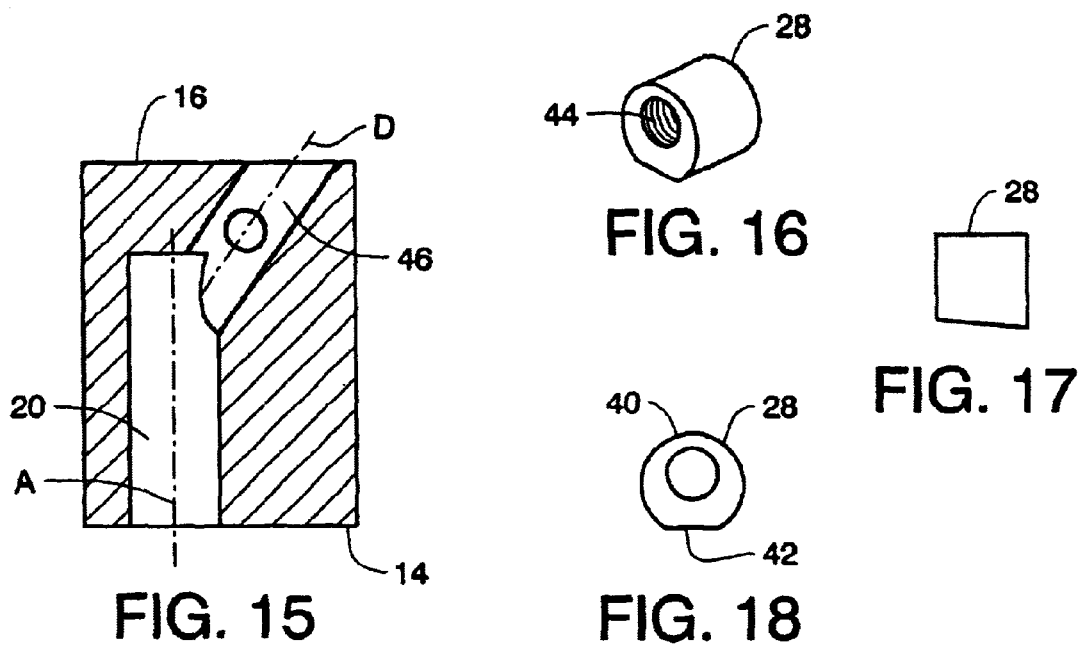
FIG. 15 is a cross sectional view of the wedge clamping assembly of FIG. 13 taken along line 15—15.
FIG. 16 is a perspective view of the wedge block of the wedge clamping assembly.
FIG. 17 is a side view of the wedge block of FIG. 16.
FIG. 18 is an end view of the wedge block of FIG. 16.

A threaded bore 46 is located in communication with the slot 20. As shown in FIGS. 4, 5, 8 and 15, the bore 46 extends from the bottom surface 16 of the cutter body to the slot 20. In a preferred embodiment as shown in FIGS. 4 and 5, the bore 46 is adapted to receive an adjustable stop 48 to support the tip of the cutting blade 22 at the desired height from the top surface of the face hobbing cutter. In the preferred embodiment, the adjustable stop 48 comprises a set screw having a generally truncated conical forward end 52 which may be adjustably threaded within the bore to contact at least a portion of the bottom of the cutting blade 22 and support the cutting blade within the slot. In an alternate embodiment as shown in FIGS. 12 and 15, the adjustable stop 48 may comprise a set screw having a generally flat forward end 52. The longitudinal axis (D) of the adjustable stop 48 may be inclined at an angle of about 35 degrees to th longitudinal axis (A) of the slot 20. In the preferred embodiment as shown in FIGS. 5 and 8, the longitudinal axis (D) of the adjustable stop 48 is parallel and offset from the cutting blade 22 longitudinal axis (A). In either embodiment, the adjustable stop 48 may be secured in position by a set screw 54 disposed within a threaded opening positioned generally transverse of the bore 46. Once the desired height of the cutting blade 22 is obtained by adjustment of the set screw, the set screw 54 is tightened against the set screw thereby preventing th set screw from turning thereby locking the relative vertical position of the cutting blade 4 with respect to the ton surface of the cutter body, 12.

Figure 20:
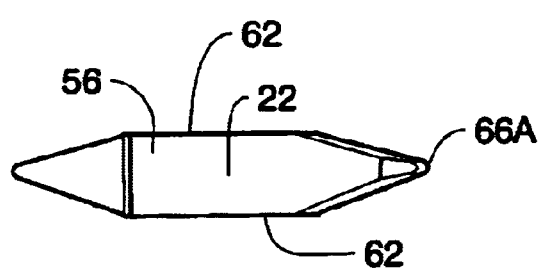
FIG. 20 is a bottom view or top view of the insert of FIG. 19.
Figure 19:
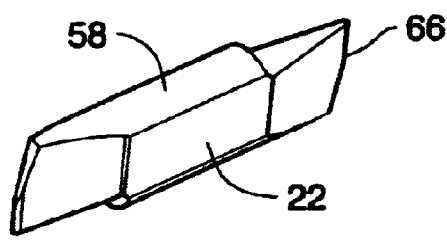
FIG. 19 is a perspective view of the cutting blade in accordance with the present invention.
Figure 21:
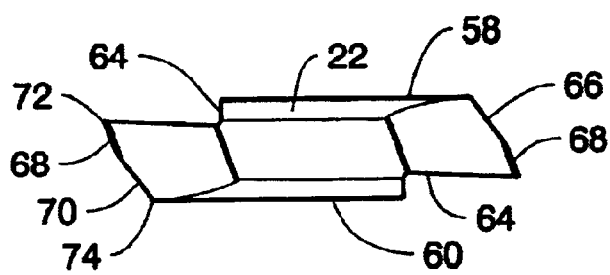
FIG. 21 is a side view of the insert of FIG. 19.
Figure 22:
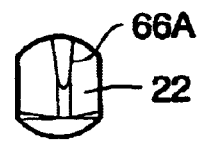
FIG. 22 is an end view of the insert of FIG. 19.

It will be appreciated that most any suitable size and shape cutting blade may be used in accordance with the present invention so long as the diameter of the cutting blade 22 fits within the diameter of the slot 20 and the cutting edges are designed to provide a desired cutting action on the material to form the gear teeth of the gear. Referring to FIGS. 19–22, there is shown a preferred embodiment of the cutting blade 22. The cutting blade 22 includes a generally longitudinal body 56 having a top surface 58, bottom surface 60 and a side surface 62 extending between the top surface and the bottom surface. The top surface 58 and the bottom surface 60 of the cutting blade 22 include a diagonally offset step portion 64. As shown in FIGS. 19 and 20, the side surfaces 62 converge at at least one end of the longitudinal body 56 to form a tip 66 having a chisel type edge. The chisel type edge includes a leading surface 68 and a trailing surface 70 to present a leading point 72 and a trailing point 74 when located in the slot 22.

The cutting blade 22 may be formed having two cutting tips 66 and at least two cutting edges 66a at each end thereof such that the cutting blade is indexable. Furthermore as shown in the figures, it is possible that two cutting tips 66 can provide four cutting edges 66a since the parallel holes use a different surface of the cutting edge than the inclined holes. It will be appreciated that if the cutting blade 22 only has a single tip 66 as opposed to two cutting tips, the same cutting blade may be used in both the parallel and the inclined sets of slots 20A and 20B to provide two cutting edges. If necessary, the nose radius of the insert tip 66 may also be modified to make use of both edges as is well known in the art.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit. For example, the present invention may also be applied to milling teeth and function as well.

What is claimed is:

1. A face hobbing cutter comprising:
   a cutter body having a top surface and a bottom surface and a side surface extending between the top surface and the bottom surface;
   a plurality of slots formed within the cutter body extending from the top surface inward into the cutter body, the slots adapted to receive cutting blades; wherein each cutting blade is fixed in position in the respective slot by a wedge clamping assembly, the wedge clamping assembly including a wedge block and a wedge screw for operatively securing the wedge block with respect to the slot, the wedge block including a locking surface for engaging a side of the cutting blade; and
   an adjustable stop, the adjustable stop in communication with the slot to support the cutting blade at the desired height from the top surface of the face hobbing cutter.

2. The face hobbing cutter of claim 1 wherein each wedge clamping assembly is positioned about the circumference of the top surface of the cutter body.

3. The face hobbing cutter of claim 1 wherein the cutter body is a circular disk and the slots are located around the perimeter of the top surface of the cutter body.

4. The face hobbing cutter of claim 1 wherein the slots extend from the top surface completely through the cutter body to the bottom surface.

5. The face hobbing cutter of claim 1 wherein the slots extend from the top surface only partially through the cutter body.

6. The face hobbing cutter of claim 1 wherein the slots are arranged in an alternating arrangement between a first set of slots oriented in a substantially vertical orientation parallel to a central axis of the cutter body and a second set of slots oriented in an inclined position angled with respect to the central axis of the cutter body.

7. The face hobbing cutter of claim 6 wherein wedge clamping assemblies are positioned to alternate between a radially inward side of the second set of slots and a radially outward side of the first set of slots to support the cutting blade in the slot during cutting of the gear teeth.

8. The face hobbing cutter of claim 6 wherein the second set of slots are inclined at an angle toward the central axis of rotation in a direction moving away from the top surface of the cutter body.

9. The face bobbing cutter of claim 6 wherein the orientation of the cutting blades are such that when the cutting blades are placed in the first set of slots the cutting blades cut and form one side of the gear tooth and when the cutting blades are placed in the second set of slots the cutting blades cut and form the other side of the same gear tooth thereby completing the formation of the gear teeth.

10. The face hobbing cutter of claim 9 wherein the wedge clamping assembly is disposed within an opening.

11. The face hobbing cutter of claim 10 wherein the opening includes two interconnected apertures.

12. The face hobbing cutter of claim 11 wherein the apertures have dissimilar widths and a common central axis.

13. The face hobbing cutter of claim 12 wherein the central axis of the opening is angled from the central axis of the slot.

14. The face hobbing cutter of claim 13 wherein the angle between the central axis of the opening and the central axis of the slot is between zero and ten degrees.

15. The face hobbing cutter of claim 13 wherein the angle between the central axis of the opening and the central axis of the slot is between four and seven degrees.

16. The face hobbing cutter of claim 11 wherein the apertures are positioned with the largest diameter aperture atop the smaller diameter aperture.

17. The face hobbing cutter of claim 16 wherein the upper aperture is generally semicircular in form and includes a rear portion and a forward portion, the rear portion includes an arcuate shape bearing wall that tapers outwardly as it extends upwardly from a bottom of the upper aperture, wherein the forward portion of the upper aperture is in communication with the slot thereby forming a large figure "8" shape opening in the top surface of the cutter body.

18. The face hobbing cutter of claim 17 wherein the lower aperture is threaded to receive the wedge screw.

19. The face hobbing cutter of claim 18 wherein the axis of the threaded aperture is parallel to the rear arcuate bearing wall of the wedge clamping assembly.

20. The face hobbing cutter of claim 1 further comprising an adjustable stop to support the cutting blade within the slot.

21. The face hobbing cutter of claim 20 wherein the adjustable stop includes a set screw threadably adapted within a bore in communication with the slot, the set screw having a generally flat forward end which may be adjustably threaded within the bore to contact at least a portion of the bottom of the cutting blade and support the cutting blade within the slot.

22. The face hobbing cutter of claim 21 wherein the axis of the adjustable stop is inclined at an angle of about 35 degrees to the cutting blade longitudinal axis.

23. The face hobbing cutter of claim 20 wherein the adjustable stop includes a set screw threadably adapted within a bore in communication with the slot, the set screw having a forward end which may be adjustably threaded within the bore to contact at least a portion of the bottom of the cutting blade and support the cutting blade within the slot wherein the axis of the adjustable stop is parallel with the longitudinal axis of the slot.

24. The face hobbing cutter of claim 20 wherein the adjustable stop is secured in position by a set screw disposed within a threaded opening positioned generally transverse of the bore.

25. The face hobbing cutter of claim 1 wherein the cutting blade comprises a body of hard, wear resistant, coated or uncoated, cemented hard metallic carbide.

26. The face hobbing cutter of claim 1 wherein the metallic carbide is a tungsten or titanium carbide, or a mixture thereof.

27. The face hobbing cutter of claim 1 wherein the cutting blade includes a generally longitudinal body having a top surface, bottom surface and a side surface extending between the top surface and the bottom surface, the top surface and the bottom surface of the cutting blade include a diagonally offset step portion the side surfaces converge at at least one end of the longitudinal body to form a tip having a chisel type edge.

28. The face hobbing cutter of claim 27 wherein the chisel type edge includes a leading surface and a trailing surface to present a leading point and a trailing point.

29. The face hobbing cutter of claim 25 wherein the cutting blade includes two cutting tips and at least two cutting edges at each end thereof such that the cutting blade is indexable.

30. The face hobbing cutter of claim 29 wherein the cutting blade includes four cutting edges.

31. The face hobbing cutter of claim 27 wherein the cutting blade tip is radiused.

32. A face hobbing cutter comprising:
   a cutter body having a top surface and a bottom surface and a side surface extending between the top surface and the bottom surface;
   a plurality of slots formed within the cutter body extending from the top surface inward into the cutter body, the slots adapted to receive cutting blades; wherein each cutting blade is fixed in position in the respective slot by a wedge clamping assembly, the wedge clamping assembly disposed within an opening formed in the cutter body and including an upper aperture and a threaded lower aperture, wherein a forward portion of the upper aperture is in communication with the slot, wherein the wedge clamping assembly includes a wedge block and a wedge screw threaded within the lower aperture for operatively securing the wedge block within the opening, the wedge block including a locking surface for engaging a side of the cutting blade; and
   an adjustable stop, the adjustable stop in communication with the slot to support the cutting blade at the desired height from the top surface of the face hobbing cutter.

33. The face hobbing cutter of claim 32 wherein the axis of the threaded aperture is parallel to the rear arcuate bearing wall of the wedge clamping assembly.

34. The face hobbing cutter of claim 33 wherein the adjustable stop includes a set screw threadably adapted within a bore in communication with the slot, the set screw having a generally flat forward end which may be adjustably threaded within the bore to contact at least a portion of the bottom of the cutting blade and support the cutting blade within the slot.

35. The face hobbing cutter of claim 32 wherein the adjustable stop includes a set screw threadably adapted within a bore in communication with the slot, the set screw having a generally truncated frustoconical forward end which may be adjustably threaded within the bore to contact at least a portion of the bottom of the cutting blade and support the cutting blade within the slot.

36. The face hobbing cutter of claim 34 wherein the axis of the adjustable stop is inclined at an angle of about 35 degrees to the cutting blade longitudinal axis.

37. The face hobbing cutter of claim 35 wherein the axis of the adjustable stop is parallel with the longitudinal axis of the slot.

38. The face hobbing cutter of claim 33 wherein the adjustable stop is secured in position by a set screw disposed within a threaded opening positioned generally transverse of the bore.

* * * * *